US009924549B2

(12) United States Patent
Lee

(10) Patent No.: US 9,924,549 B2
(45) Date of Patent: Mar. 20, 2018

(54) METHOD FOR CONNECTING LOCAL COMMUNICATION AND ELECTRONIC DEVICE SUPPORTING THE SAME

(71) Applicant: Samsung Electronics Co., Ltd., Gyeonggi-do (KR)

(72) Inventor: Ki Wan Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/078,967

(22) Filed: Mar. 23, 2016

(65) Prior Publication Data

US 2016/0286584 A1  Sep. 29, 2016

(30) Foreign Application Priority Data

Mar. 23, 2015 (KR) .......................... 10-2015-0040104

(51) Int. Cl.
*G06F 21/35* (2013.01)
*H04W 76/02* (2009.01)
(Continued)

(52) U.S. Cl.
CPC .......... *H04W 76/021* (2013.01); *G06F 21/35* (2013.01); *H04L 63/0853* (2013.01); *H04W 4/008* (2013.01); *H04L 63/0876* (2013.01)

(58) Field of Classification Search
CPC .................. H04L 63/0853; H04L 63/0876
See application file for complete search history.

(56) References Cited

U.S. PATENT DOCUMENTS

2005/0197158 A1\* 9/2005 Silverbrook ............. B41J 3/445
455/556.2
2010/0138572 A1\* 6/2010 Rofougaran .......... G06F 13/385
710/106
(Continued)

FOREIGN PATENT DOCUMENTS

EP  2 175 674 A1   4/2010
EP  2 375 403 A2  10/2011
(Continued)

OTHER PUBLICATIONS

European Search Report dated May 17, 2016 in connection with European Patent Application No. EP 16 16 1950.

*Primary Examiner* — David Bilodeau

(57) ABSTRACT

A communication method performed at an electronic device includes receiving first identification information through an auxiliary device which is connectable with the electronic device, comparing the received first identification information with second identification information stored in the electronic device, and connecting with an external electronic device through local communication based on at least one of the first identification information or the second identification information, if the first identification information and the second identification information are different from each other. An electronic device includes a processor configured to control the display, the memory, or the communication module, and connect with an external electronic device through local communication based on at least one of first identification information received through the auxiliary device or second identification information stored in the memory.

19 Claims, 12 Drawing Sheets

(51) Int. Cl.
 *H04W 4/00* (2018.01)
 *H04L 29/06* (2006.01)

(56) References Cited

U.S. PATENT DOCUMENTS

| | | | |
|---|---|---|---|
| 2011/0237189 A1* | 9/2011 | Ye | G09G 5/006 |
| | | | 455/41.2 |
| 2012/0276919 A1* | 11/2012 | Bi | H04W 48/04 |
| | | | 455/456.1 |
| 2013/0023256 A1 | 1/2013 | Lu | |
| 2014/0162560 A1* | 6/2014 | Ye | H04N 21/4122 |
| | | | 455/41.3 |
| 2014/0177615 A1 | 6/2014 | Kim et al. | |
| 2014/0373123 A1 | 12/2014 | Kang | |

FOREIGN PATENT DOCUMENTS

| KR | 10-1397018 B1 | 5/2014 |
|---|---|---|
| KR | 10-2014-0080236 A | 6/2014 |

\* cited by examiner

METHOD FOR CONNECTING LOCAL COMMUNICATION AND ELECTRONIC DEVICE SUPPORTING THE SAME

CROSS-REFERENCE TO RELATED APPLICATION AND CLAIM OF PRIORITY

The present application is related to and claims the benefit under 35 U.S.C. § 119(a) of a Korean patent application filed on Mar. 23, 2015 in the Korean Intellectual Property Office and assigned Serial number 10-2015-0040104, the entire disclosure of which is hereby incorporated by reference.

TECHNICAL FIELD

The present disclosure relates to a method for transmitting and receiving data through local communication between electronic devices and an electronic device supporting the same.

BACKGROUND

An electronic device, such as a smart phone or a tablet personal computer (PC), is able to perform various functions, such as call connection, message sending/receiving, media output, and the like. The electronic device transmits and receives not only wireless data through a base station or the like but also data through local wireless communication with an adjacent device.

In the case where an electronic device is connected to a surrounding device through local wireless communication, such as Wi-Fi Direct, a conventional communication method requires the complex setting procedure including, but not limited to, moving the device at a distance where near filed communication (NFC) is able to operate, searching for the device to connect, and executing data communication. In the case where the setting and connection of the local wireless communication are inconvenient, some users use long distance wireless communication (a manner to transmit data through a base station) instead of the local wireless communication (direct connection between devices) for tasks, such as screen sharing, file transmission, and the like.

SUMMARY

To address the above-discussed deficiencies, it is a primary object to provide at least the advantages described below. Accordingly, an aspect of the present disclosure is to provide a communication method for performing local wireless communication easily using an auxiliary device connectable with an electronic device.

In accordance with an aspect of the present disclosure, a communication method may be performed at an electronic device and may include receiving first identification information through an auxiliary device which is connectable with the electronic device, comparing the received first identification information with second identification information stored in the electronic device, and connecting with an external electronic device through local communication based on at least one of the first identification information or the second identification information, if the first identification information and the second identification information are different from each other Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
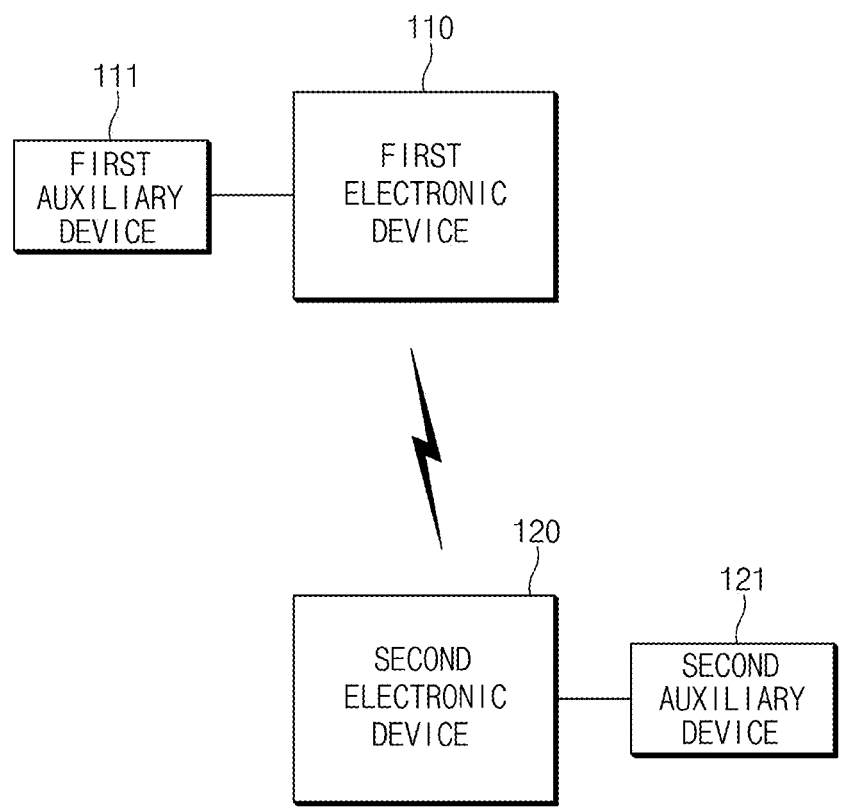
FIG. 1 is a block diagram illustrating a local communication network according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. Furthermore, such terms may be used to distinguish one element from another element. For example, "a first user device" and "a second user device" indicate different user devices, regardless of the order or importance. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

FIG. 1 is a block diagram illustrating a local communication network according to various embodiments of the present disclosure.

Referring to FIG. 1, a first electronic device 110 and a second electronic device 120 may be connected to each other through local wireless communication. Each of the first and second electronic devices 110 and 120 may include a communication module (not illustrated) which performs a role of an interface for the local wireless communication. According to various embodiments of the present disclosure, the communication module may support data communication by Wireless Fidelity (Wi-Fi) Direct. The Wi-Fi Direct may refer to a local communication method which makes it possible to directly form a channel between electronic devices, which support not an Internet network but Wi-Fi, and to transmit and receive data. The first electronic device 110 and the second electronic device 120 may perform operations, such as file transmission, screen mirroring, and the like, with the Wi-Fi Direct.

The first electronic device 110 and the second electronic device 120 may set the local wireless communication using a first auxiliary device 111 and a second auxiliary device 121 which the first and second electronic devices 110 and 120 are respectively equipped with, so as to be connected to each other.

The first electronic device 110 and the second electronic device 120 may be connected to the first auxiliary device 111 and the second auxiliary device 121, respectively. The first auxiliary device 111 (e.g., a touch pen) may be a device which is connected to or disposed to be adjacent to the first electronic device 110 so as to perform a function. The second auxiliary device 121 (e.g., a touch pen) may be a device which is connected to or disposed to be adjacent to the second electronic device 120 so as to perform a function.

According to various embodiments of the present disclosure, the first auxiliary device 111 and the second auxiliary device 121 may be devices which of the shapes are the same as or similar to each other so as to be compatible with each other.

According to various embodiments of the present disclosure, the first auxiliary device 111 and the second auxiliary device 121 may be accessory devices each of which has shapes or functions corresponding to the first electronic device 110 or the second electronic device 120. For example, the first auxiliary device 111 and the second auxiliary device 121 may be an input pen, a keyboard device, a battery cover, a case, or a decoration device (e.g., an electronic sticker, an ornament which includes a simple circuitry, or the like).

According to various embodiments of the present disclosure, the first auxiliary device 111 may be inserted into and connected to the first electronic device 110 or the second electronic device 120 or may be attached to the outside so as to be connected therewith. In various embodiments, the first auxiliary device 111 may include a contact area, which is electrically connected to the first electronic device 110 or the second electronic device 120, in at least a portion of the first auxiliary device 111.

According to various embodiments of the present disclosure, the first auxiliary device 111 may include a storage chip or a memory therein and may store identification information (e.g., A001) about the first electronic device 110. In the case where the first auxiliary device 111 is connected to the first electronic device 110 or the second electronic device 120, the first auxiliary device 111 may provide the stored identification information about the first electronic device 110 to the connected electronic device (e.g., the first electronic device 110 or the second electronic device 120). The first electronic device 110 or the second electronic device 120 may determine whether to execute or end the local wireless communication based on the identification information received through the first auxiliary device 111. For example, in the case where the first auxiliary device 111 is inserted into the second electronic device 120, the second electronic device 120 may compare the identification information (e.g., A001) provided from the first auxiliary device 111 with identification information (e.g., B001) about the second electronic device 120 which is stored in inside the second electronic device 120. In the case where the pieces of identification information are different from each other, the second electronic device 120 may start a local wireless communication function. For another example, in the case where the first auxiliary device 111 is inserted into the first electronic device 110, the first electronic device 110 may compare the identification information (e.g., A001) provided from the first auxiliary device 111 with the identification information (e.g., A001), which is stored in inside the first electronic device 110, about the first electronic device 110. In the case where the pieces of identification information are the same as each other, the first electronic device 110 may end a local wireless communication function which is being executed.

The second auxiliary device 121 may perform a function which is the same as or similar to the first auxiliary device 111. Shapes or functions of the first auxiliary device 111 and the second auxiliary device 121 may be the same as or similar to each other. Unlike the first auxiliary device 111, the second auxiliary device 121 may store the identification information (e.g., B001) about the second electronic device 120.

Detailed information about a communication method using an auxiliary device will be provided through FIGS. 2 to 12.

Figure 2:
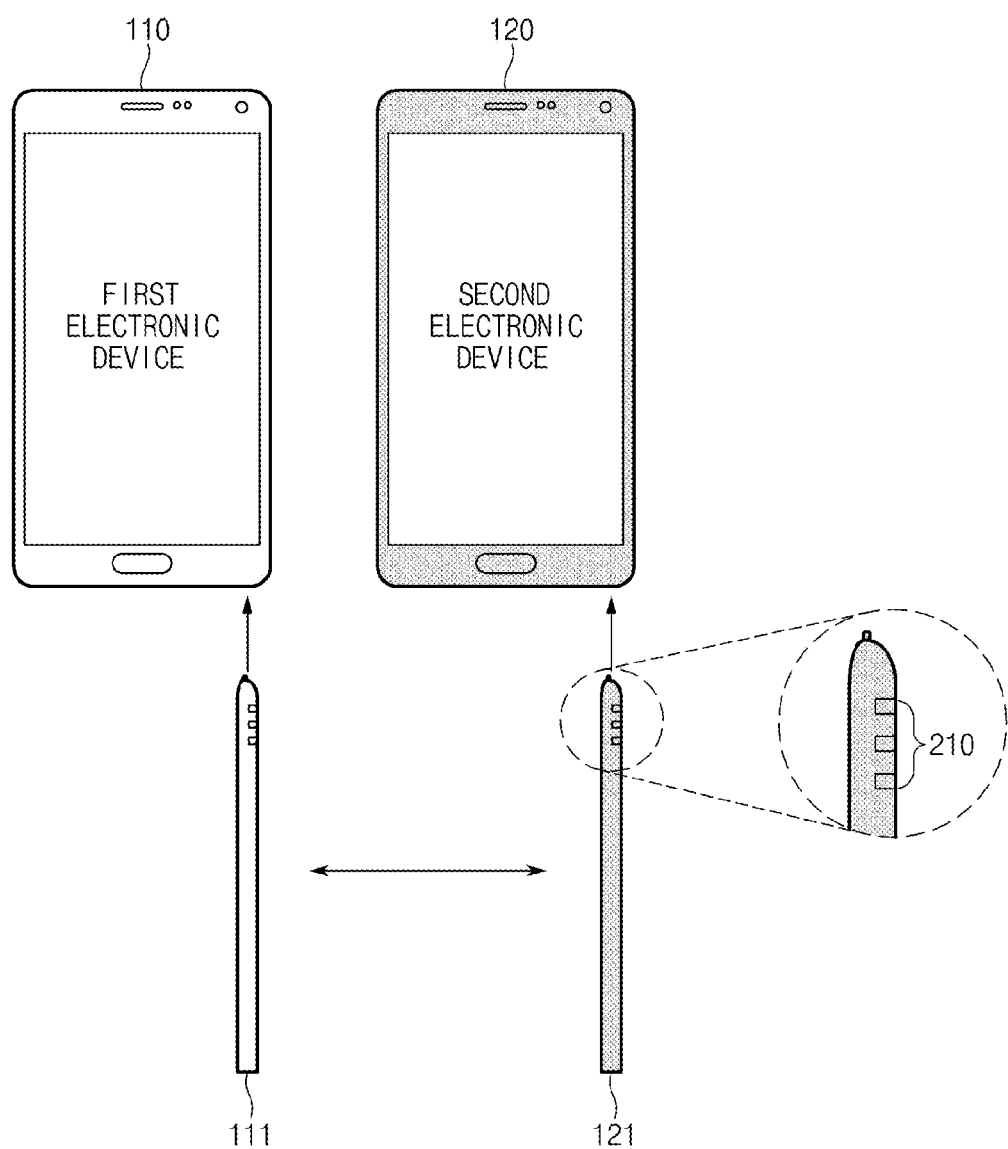
FIG. 2 is a schematic diagram of an electronic device which uses an input pen as an auxiliary device, according to various embodiments of the present disclosure.

FIG. 2 is a schematic diagram of an electronic device which uses an input pen as an auxiliary device, according to various embodiments of the present disclosure. In FIG. 2, an embodiment of the present disclosure is exemplified as each of the first auxiliary device 111 and the second auxiliary device 121 is an input pen which is inserted into the inside of an electronic device so as to be connected therewith. However, the scope and spirit of the present disclosure may not be limited thereto.

Referring to FIG. 2, the first electronic device 110 or the second electronic device 120 may be connected to the first auxiliary device 111 or the second auxiliary device 121 (the connection may include the case where the auxiliary device is disposed to be adjacent to an electronic device and is used). Since being the same as or similar to each other in shape or function, the first auxiliary device 111 and the second auxiliary device 121 may be compatible with each other.

The first auxiliary device 111 may be inserted into and connected to the second electronic device 120 as well as the first electronic device 110. In the case where the first auxiliary device 111 is inserted into and connected to the second electronic device 120, the second electronic device 120 may receive identification information (e.g., the identification information about the first electronic device 110) stored in the first auxiliary device 111. The second electronic device 120 may start a connection through local communication with the first electronic device 110 based on the identification information (e.g., identification information about the first electronic device 110) received from the first auxiliary device 111 and the identification information (e.g., identification information about the second electronic device 120) stored in the second electronic device 120.

In the case where the first auxiliary device 111 is inserted into and connected to the second electronic device 120, the second auxiliary device 121 can be released from the second electronic device 120. In this case, the second auxiliary device 121 can be inserted into and connected to the first electronic device 110. The first electronic device 110 can receive the identification information (e.g., the identification information about the second electronic device 120) stored in the second auxiliary device 121. The first electronic device 110 can start a connection with the second electronic device 120 through local communication based on the identification information (e.g., the identification information about the second electronic device 120) received from the second auxiliary device 121 and the identification information (e.g., the identification information about the first electronic device 110) stored in the first electronic device 110.

According to various embodiments of the present disclosure, each of the first auxiliary device 111 and the second auxiliary device 121 can include a contact area 210. In the case where the contact area 210 is placed inside the electronic device (e.g., the first electronic device 110 or the second electronic device 120), the contact area 210 can be physically connected to the electronic device through a pogo pin which is disposed inside the electronic device. The first auxiliary device 111 and the second auxiliary device 121 can transmit and receive electrical data to and from the electronic device (e.g., the first electronic device 110 or the second electronic device 120) through the contact area 210. For example, the first auxiliary device 111 and the second auxiliary device 121 can provide the identification information stored in each of the auxiliary devices to the first electronic device 110 or the second electronic device 120 through the contact area 210.

In the case where the identification information received from a connected auxiliary device is different from the identification information stored in the electronic device connected with the auxiliary device, the first electronic device 110 or the second electronic device 120 can perform the connection through local communication based on the identification information. Additional information about the local communication connection will be described through FIGS. 3 to 7.

Below, an embodiment of the present disclosure will be exemplified as an auxiliary device is an input pen. However, the scope and spirit of the present disclosure may not be limited thereto. For example, the present disclosure can be applied to the case where the auxiliary device is a battery cover, a keyboard device, a case, a decoration device, or the like.

Figure 3:
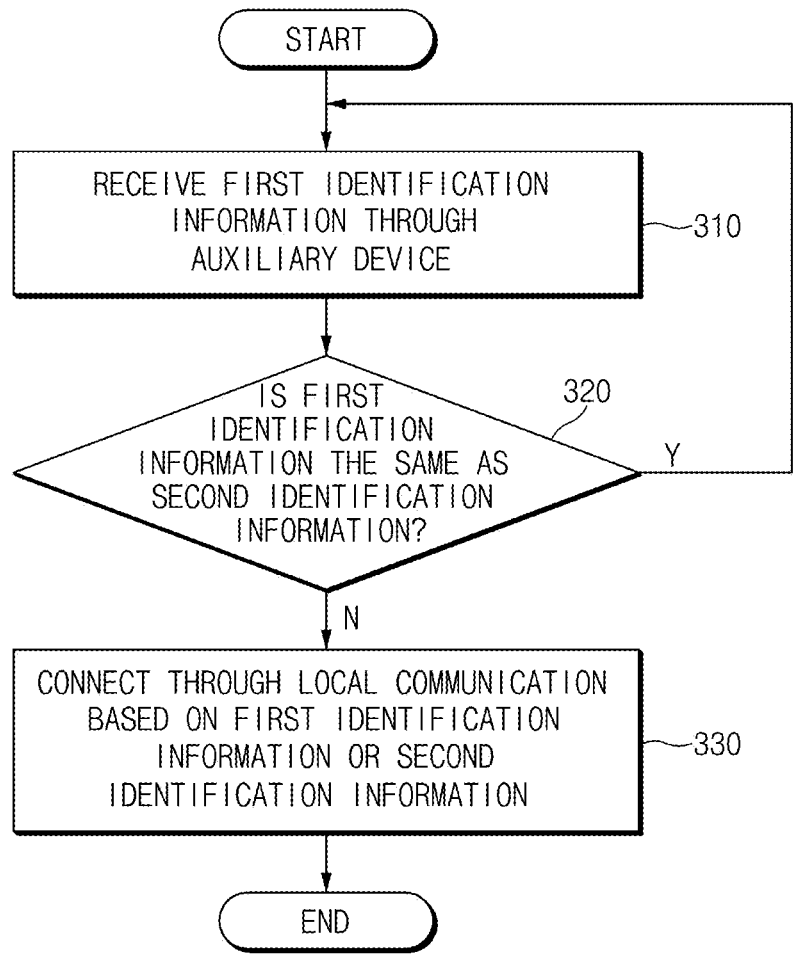
FIG. 3 is a flowchart illustrating a communication method using an auxiliary device, according to various embodiments of the present disclosure.

FIG. 3 is a flowchart illustrating a communication method using an auxiliary device, according to various embodiments of the present disclosure.

Referring to FIG. 3, in operation 310, an electronic device (e.g., the first electronic device 110 or the second electronic device 120) can receive first identification information from the connected auxiliary device (e.g., the first auxiliary device 111 or the second auxiliary device 121). For example, in the case where the first auxiliary device 111 is connected, the first identification information can be identification information about the first electronic device 110. In the case where the second auxiliary device 121 is connected, the first identification information can be identification information about the second electronic device 120.

The auxiliary device can provide the identification information (e.g., A001, B001, or the like) stored in the internal chip or the like, to the connected electronic device. The electronic device (e.g., the first electronic device 110 or the second electronic device 120) can determine whether to perform a connection through local communication based on the received first identification information.

In operation 320, the electronic device (e.g., the first electronic device 110 or the second electronic device 120) can determine whether the first identification information received from the auxiliary device (e.g., the first auxiliary device 111 or the second auxiliary device 121) is the same as second identification information (identification information about the electronic device itself) stored in the electronic device in advance.

As illustrated in FIG. 2, in the case where the first auxiliary device 111 is inserted into the first electronic device 110, both the first identification information and the second identification information can be the same as the identification information of the first electronic device 110. In this case, the first electronic device 110 may not perform a separate connection through the local communication.

Likewise, in the case where the second auxiliary device 121 is inserted into the second electronic device 120, both the first identification information and the second identification information can be the same as the identification information of the second electronic device 120. In this case, the second electronic device 120 may not perform a separate connection through the local communication.

In operation 330, in the case where the first identification information is different from the second identification information, the electronic device (e.g., the first electronic device 110 or the second electronic device 120) can perform the connection through the local communication based on the first and second identification information.

In an exemplification of FIG. 2, in the case where the second auxiliary device 121 is inserted into the first electronic device 110, the first identification information can be the identification information (e.g., B001) of the second electronic device 120, and the second identification information can be the identification information (e.g., A001) of the first electronic device 110. In this case, since the first identification information and the second identification information have different values, the first electronic device 110 can perform signal transmission or signal search for the connection through the local communication based on the first and second identification information.

Likewise, in the case where the first auxiliary device 111 is inserted into the second electronic device 120, the first identification information can be the identification information (e.g., A001) of the first electronic device 110, and the second identification information can be the identification information (e.g., B001) of the second electronic device 120. In this case, since the first identification information and the second identification information have different values, the second electronic device 120 can perform signal transmission or signal search for the connection through the local communication based on the first and second identification information. Information about the signal transmission or the signal search will be described through FIGS. 5 to 7.

Figure 4:
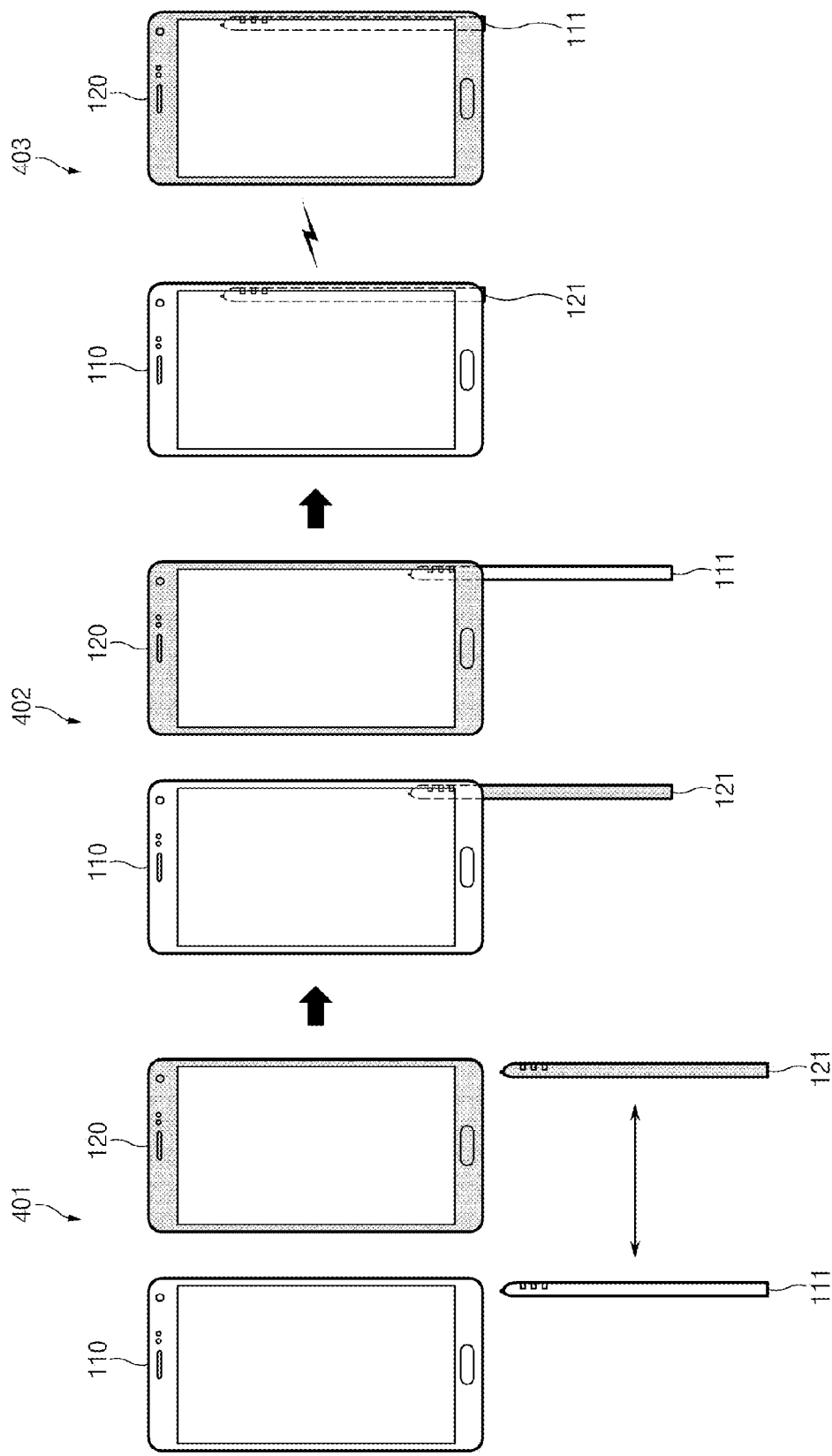
FIG. 4 is a schematic diagram for describing a method in which a communication connection is made by exchanging auxiliary devices, according to various embodiments of the present disclosure.

FIG. 4 is a schematic diagram for describing a method in which a communication connection is made by exchanging auxiliary devices, according to various embodiments of the present disclosure. In FIG. 4, an embodiment of the present disclosure is exemplified as input pens are exchanged. However, the scope and spirit of the present disclosure may not be limited thereto.

Referring to FIG. 4, in state 401, the first electronic device 110 can be set to correspond to the first auxiliary device 111 by default. The first auxiliary device 111 can be configured to store identification information (e.g., A001) of the first electronic device 110.

The second electronic device 120 can be set to correspond to the second auxiliary device 121 by default. The second auxiliary device 121 can be configured to store identification information (e.g., B001) of the second electronic device 120.

Shapes or functions of the first auxiliary device 111 and the second auxiliary device 121 can be the same as or similar to each other. The first auxiliary device 111 and the second auxiliary device 121 can be exchanged each other so as to be connected with the second electronic device 120 and the first electronic device 110, respectively.

In state 402, in the case where a user wants to connect the first electronic device 110 and the second electronic device 120 through local communication (e.g., Wi-Fi Direct communication), the local communication can be initiated by exchanging each of auxiliary devices (e.g., the first auxiliary device 111 and the second auxiliary device 121).

In state 403, in the case where the auxiliary devices are exchanged and inserted, each electronic device can receive identification information stored in each auxiliary device through a contact area of the auxiliary device. Each electronic device can determine that the identification information received through the auxiliary device is different from the identification information stored in each electronic device and can transmit or search for a signal for the local wireless communication.

Figure 5:
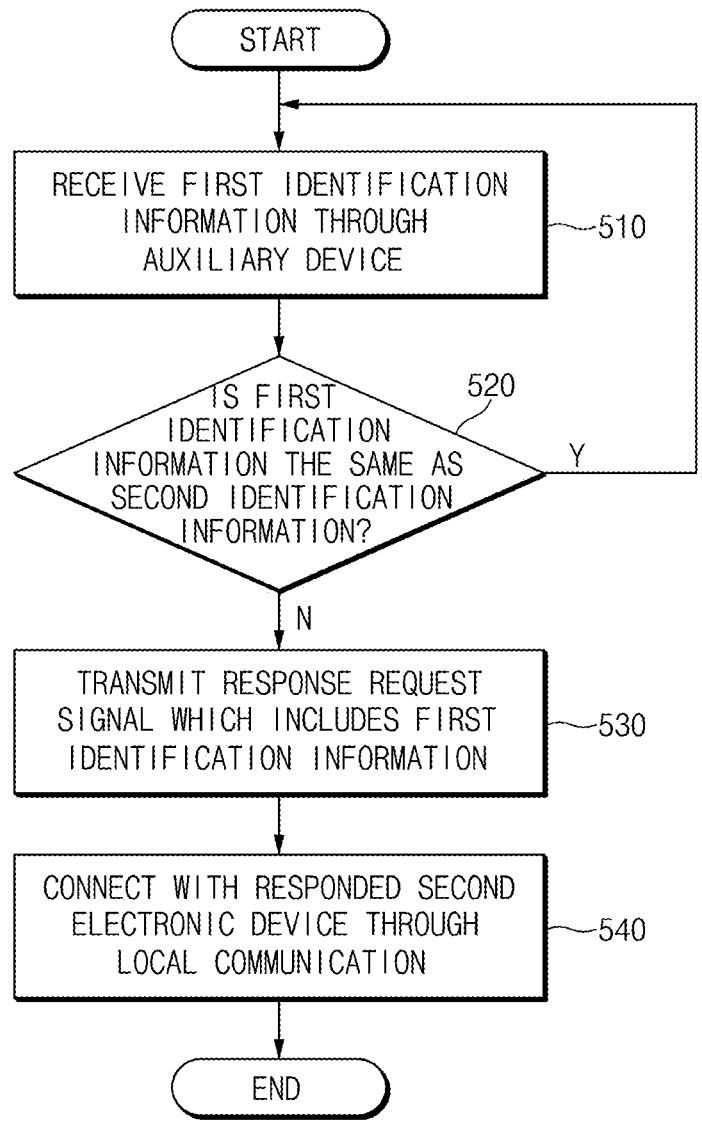
FIG. 5 is a flowchart illustrating a method for connecting through local communication using first identification information, according to various embodiments of the present disclosure.

FIG. 5 is a flowchart illustrating a method for connecting through local communication using first identification information, according to various embodiments of the present disclosure. Below, an embodiment of the present disclosure will be described based on the first electronic device 110. However, an embodiment of the present disclosure can be applied to the second electronic device 120.

Referring to FIG. 5, in operation 510, the first electronic device 110 can receive first identification information from a connected auxiliary device (e.g., the first auxiliary device 111 or the second auxiliary device 121). In the case where the first auxiliary device 111 is connected, the first identification information can be identification information about the first electronic device 110. In the case where the second auxiliary device 121 is connected, the first identification information can be identification information about the second electronic device 120.

In operation 520, the first electronic device 110 can determine whether the first identification information received from the auxiliary device is the same as second identification information (the identification information about the first electronic device 110) stored in the first electronic device in advance. In the case where the first identification information and the second identification information are the same as each other, the first electronic device 110 can maintain a current operation state without performing local wireless communication.

In operation 530, in the case where the first identification information is different from the second identification information, the first electronic device 110 can transmit a response request signal, which includes the first identification information, to the second electronic device 120. According to various embodiments of the present disclosure, the response request signal can be transmitted to a plurality of devices in a multicast or broadcast manner.

In the case where the response request signal which includes the identification information about the second electronic device 120 is transmitted, the second electronic device 120 can transmit a response signal to the first electronic device 110 for the local wireless communication.

In operation 540, the first electronic device 110 can ascertain the response signal corresponding to the response request signal and can be connected to the second electronic device 120 through the local wireless communication. After a channel is formed through the local wireless communication, the first electronic device 110 can perform data communication, such as file transmission, screen mirroring, data sharing, or the like, with the second electronic device 120.

Figure 6:
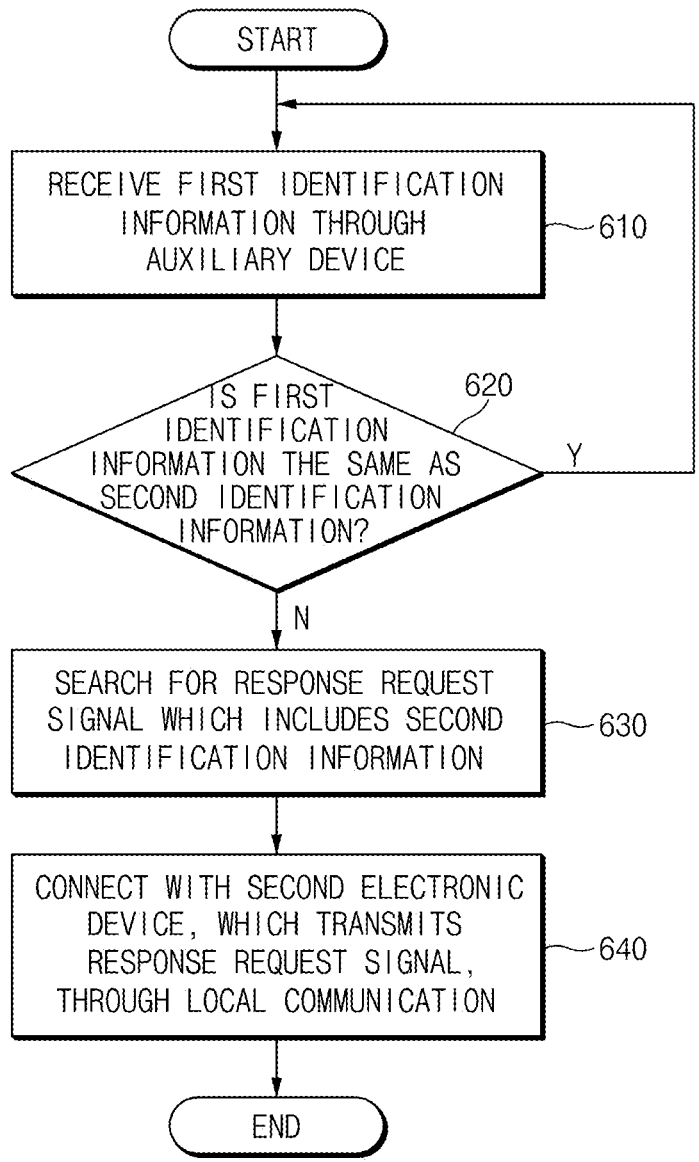
FIG. 6 is a flowchart illustrating a method for connecting through local communication using second identification information, according to various embodiments of the present disclosure.

FIG. 6 is a flowchart illustrating a method for connecting through local communication using second identification information, according to various embodiments of the present disclosure. Below, an embodiment of the present disclosure will be described based on the first electronic device 110. However, an embodiment of the present disclosure can be applied to the second electronic device 120.

Referring to FIG. 6, operation 610 and operation 620 can be the same as operation 510 and operation 520 of FIG. 5, respectively.

In operation 630, in the case where first identification information is different from second identification information, the first electronic device 110 can search for a surrounding signal and can determine whether there is a response request signal which includes the second identification information (e.g., the identification information about the first electronic device 110). According to various embodiments of the present disclosure, one (e.g., the second electronic device 120) of surrounding devices of the first electronic device 110 can be equipped with the first auxiliary device 111 which was inserted into the first electronic device 110 and can transmit the response request signal which includes the identification information about the first electronic device 110.

In operation 640, in the case where the response request signal transmitted from the second electronic device 120 includes the identification information about the first electronic device 110, the first electronic device 110 can transmit a response signal corresponding to the response request signal and can be connected to the local wireless communication. According to various embodiments of the present disclosure, the response signal can be transmitted in a unicast manner.

Figure 7:
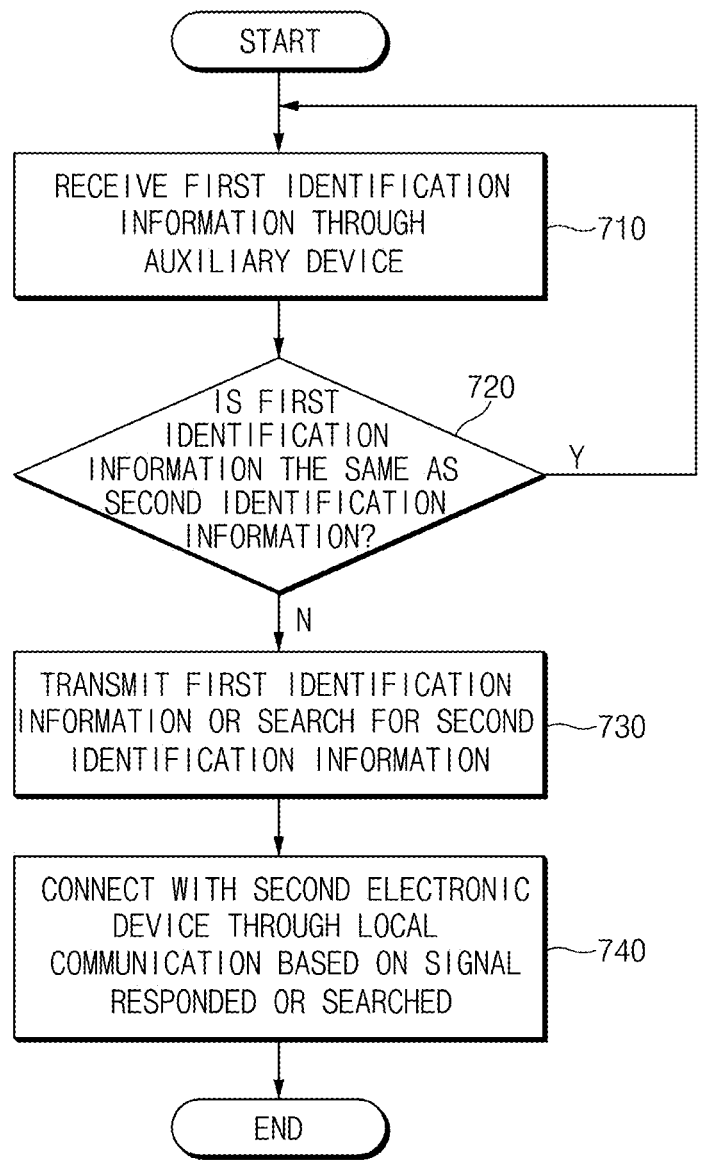
FIG. 7 is a flowchart illustrating a method for connecting through local communication using first and second identification information, according to various embodiments of the present disclosure.

FIG. 7 is a flowchart illustrating a method for connecting through local communication using first and second identification information, according to various embodiments of the present disclosure. Below, an embodiment of the present disclosure will be described based on the first electronic device 110. However, an embodiment of the present disclosure can be applied to the second electronic device 120.

Referring to FIG. 7, operation 710 and operation 720 can be the same as operation 510 and operation 520 of FIG. 5, respectively.

In operation 730, the first electronic device 110 can recognize the second electronic device 120 based on at least one of first identification information or second identification information. For example, the first electronic device 110 can transmit a response request signal, which includes the first identification information (e.g., the identification information about the second electronic device 120), to the second electronic device 120 and can simultaneously search for a surrounding signal for determining whether there is a response request signal which includes the second identification information (e.g., the identification information about the first electronic device 110). The first electronic device 110 can perform the signal transmission and the signal search at the same time, thereby increasing the efficiency in searching for the second electronic device 120.

In operation 740, the first electronic device 110 can perform data communication, such as file transmission, screen mirroring, data sharing, or the like, with the second electronic device 120.

According to various embodiments of the present disclosure, based on state information about the device, such as battery remaining capacity, an operation state of a processor, and the like, the first electronic device 110 can recognize the second electronic device 120 using at least one method of the signal transmission or the signal search. For example, in the case where the battery remaining capacity is greater than or equal to a specific value, the first electronic device 110 can perform the signal transmission and the signal search at the same time. However, in the case where the battery remaining capacity is lower than the specific value, the first electronic device 110 can recognize the second electronic device 120 using the signal search without transmitting a signal separately.

Figure 8:
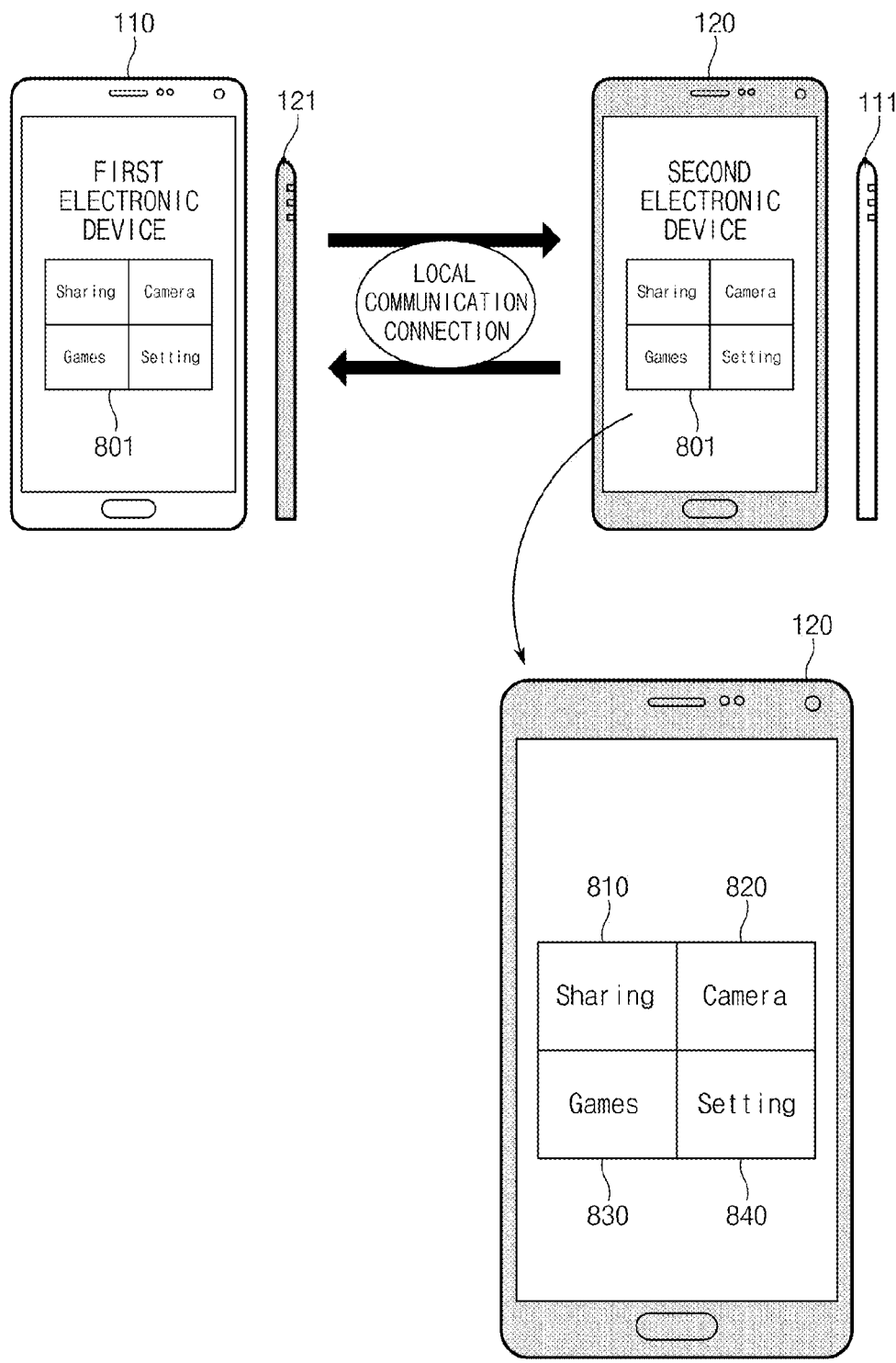
FIG. 8 is a schematic diagram illustrating a screen for operating a local communication connection, according to various embodiments of the present disclosure.

FIG. 8 is a schematic diagram illustrating a screen for operating a local communication connection, according to various embodiments of the present disclosure. In FIG. 8, a user interface (UI) screen 801 is, but is not limited to, an example.

Referring to FIG. 8, the first electronic device 110 can be set to the first auxiliary device 111 by default and the second electronic device 120 can be set to the second auxiliary device 121. The first electronic device 110 and the second electronic device 120 can start local communication by exchanging auxiliary devices.

According to various embodiments of the present disclosure, if the first electronic device 110 or the second electronic device 120 is connected to the local wireless communication by exchanging the auxiliary devices, the first electronic device 110 or the second electronic device 120 can provide the UI screen 801 which includes a function capable of being performed through the local wireless communication or a setting associated with the function. For example, the UI screen 801 can include file sharing 810, camera execution 820, games execution 830, setting 840, and the like.

According to various embodiments of the present disclosure, the UI screens 801 respectively executed in the first electronic device 110 and the second electronic device 120 can operate at the same time in conjunction with each other. For example, in the case where a user executes the file sharing 801 in the first electronic device 110, the second electronic device 120 can execute the file sharing 810 at the same time, and thus the second electronic device 120 can be changed to a state where file transmission and reception is possible. For another example, in the case where the camera execution 820 is performed in the first electronic device 110, a camera execution screen can be mirrored in the second electronic device 120 at the same time, or the captured image by the first electronic device 110 can be respectively stored in the first and second electronic devices 110 and 120 based on a setting.

Figure 9:
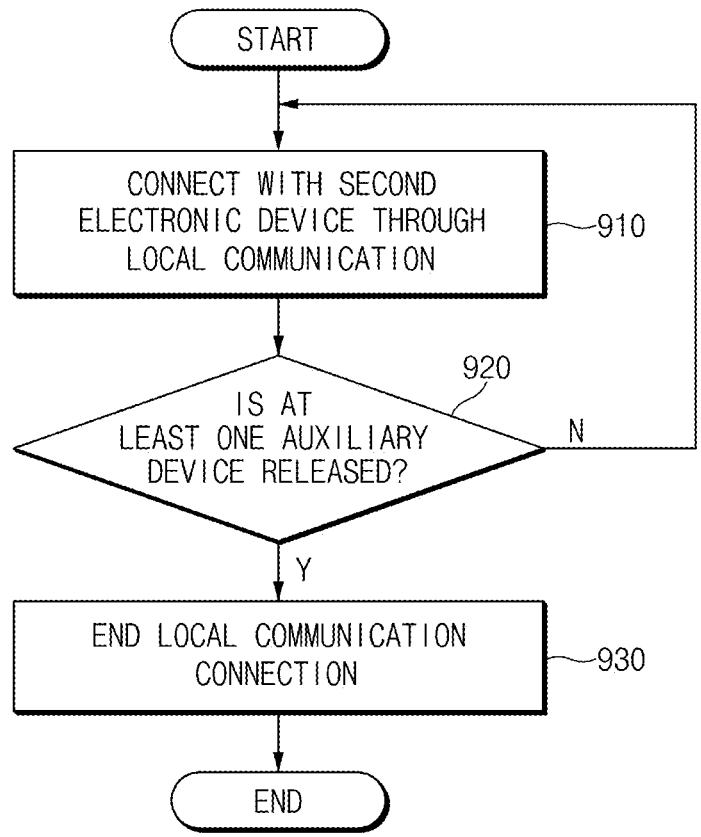
FIG. 9 is a flowchart illustrating a communication end method according to various embodiments of the present disclosure.

FIG. 9 is a flowchart illustrating a communication end method according to various embodiments of the present disclosure.

Referring to FIG. 9, in state 910, the first electronic device 110 can be connected to the second electronic device 120 by exchanging auxiliary devices. The first electronic device 110 can perform a function such as file transmission, screen mirroring, data sharing, or the like performed with regard to the second electronic device 120.

In operation 920, the first electronic device 110 or the second electronic device 120 can determine whether at least one of auxiliary devices is released therefrom. If the auxiliary device is being continuously connected with the first electronic device 110 or the second electronic device 120, data transmission can continue through the local communication.

In operation 930, in the case where the auxiliary device is released from at least one of the first electronic device 110 or the second electronic device 120, the corresponding electronic device can stop transmitting data and can end the local communication connection.

In FIG. 9, a communication ending method is, but is not limited to, an example. For example, in the case where the auxiliary device (e.g., the first auxiliary device 111 which is set at the first electronic device 110 by default and the second auxiliary device 121 which is set at the second electronic device 120 by default) which is set at each electronic device by default is connected again, the local communication can end according to a setting.

According to various embodiments of the present disclosure, a communication method performed at an electronic device can include receiving first identification information through an auxiliary device which is connectable with the electronic device, comparing the received first identification information with second identification information stored in the electronic device, and connecting with an external electronic device through local communication based on at least one of the first identification information or the second identification information, if the first identification information and the second identification information are different from each other.

According to various embodiments of the present disclosure, the connecting through the local communication can include transmitting a response request signal which includes the first identification information. The connecting through the local communication can include searching for a surrounding signal which includes the second identification information. The connecting through the local communication can include connecting to the local communication based on state information about the electronic device.

According to various embodiments of the present disclosure, the receiving of the first identification information can include connecting physically to the electronic device through a contact area included in the auxiliary device. The receiving of the first identification information can include receiving the first identification information through the contact area.

According to various embodiments of the present disclosure, the communication method can further include providing a user interface (UI) for the local communication through a display.

According to various embodiments of the present disclosure, the communication method can further include ending the local communication if a connection between the auxiliary device and the electronic device is released. The communication method can further include ending the local communication if the electronic device and an auxiliary device which is related with the electronic device in advance are connected with each other.

According to various embodiments of the present disclosure, a communication method performed between first and second electronic devices can include receiving first identification information through an auxiliary device, which is connectable with the first electronic device, at the first electronic device, comparing the received first identification information with second identification information, which is stored in the first electronic device, at the first electronic device, and connecting with the second electronic device through local communication based on at least one of the first or second identification information at the first electronic device, if the first and second identification information are different from each other.

According to various embodiments of the present disclosure, the connecting through the local communication can include transmitting a response request signal, which includes the first identification information, to the second electronic device at the first electronic device. The connecting through the local communication can include searching for a response request signal, which includes the second identification information, transmitted from the second electronic device at the first electronic device.

Figure 10:
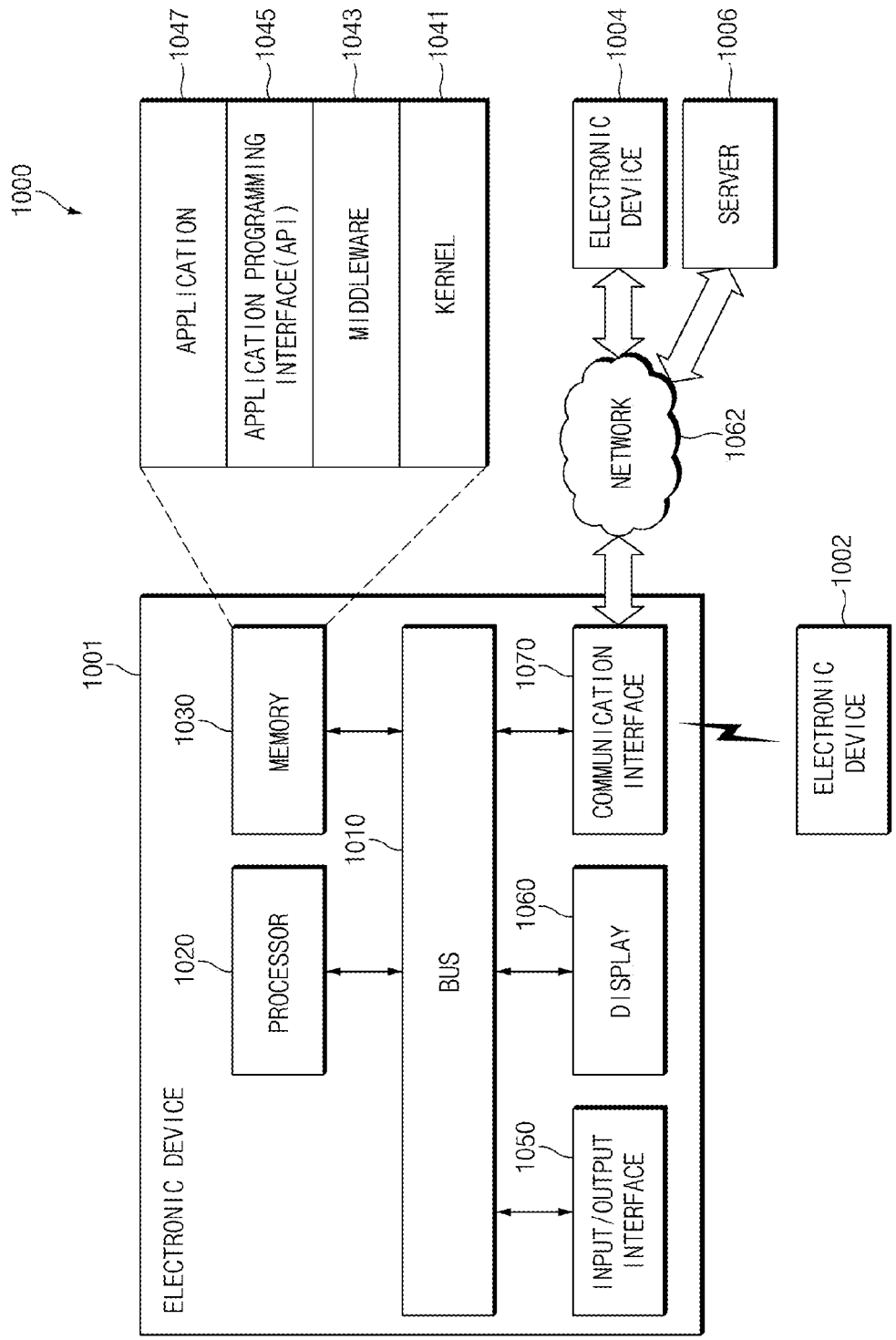
FIG. 10 is a diagram illustrating an electronic device in a network environment, according to various embodiments of the present disclosure.

FIG. 10 is a diagram illustrating an electronic device in a network environment, according to various embodiments of the present disclosure.

Referring to FIG. 10, there is illustrated an electronic device 1001 in a network environment 1000 according to various embodiments of the present disclosure. The electronic device 1001 (e.g., the first electronic device 110 of FIG. 1) can include a bus 1010, a processor 1020, a memory 1030, an input/output (I/O) interface 1050, a display 1060, and a communication interface 1070. According to an embodiment of the present disclosure, the electronic device 1001 may not include at least one of the above-described components or can further include other component(s).

The bus 1010 can interconnect the above-described components 1010 to 1070 and can be a circuit for conveying communications (e.g., a control message and/or data) among the above-described components.

The processor 1020 can include one or more of a central processing unit (CPU), an application processor (AP), or a communication processor (CP). The processor 1020 can perform, for example, data processing or an operation associated with control and/or communication of at least one other component(s) of the electronic device 1001.

The memory 1030 can include a volatile and/or nonvolatile memory. The memory 1030 can store instructions or data associated with at least one other component(s) of the electronic device 1001. According to an embodiment of the present disclosure, the memory 1030 can store software and/or a program 1040. The program 1040 can include, for example, a kernel 1041, a middleware 1043, an application programming interface (API) 1045, and/or an application program (or an application) 1047. At least a portion of the kernel 1041, the middleware 1043, or the API 1045 can be called an "operating system (OS)".

The kernel 1041 can control or manage system resources (e.g., the bus 1010, the processor 1020, the memory 1030, and the like) that are used to execute operations or functions of other programs (e.g., the middleware 1043, the API 1045, and the application program 1047). Furthermore, the kernel 1041 can provide an interface that allows the middleware 1043, the API 1045, or the application program 1047 to access discrete components of the electronic device 1001 so as to control or manage system resources.

The middleware 1043 can perform a mediation role such that the API 1045 or the application program 1047 communicates with the kernel 1041 to exchange data.

Furthermore, the middleware 1043 can process task requests received from the application program 1047 according to a priority. For example, the middleware 1043 can assign the priority, which makes it possible to use a system resource (e.g., the bus 1010, the processor 1020, the memory 1030, or the like) of the electronic device 1001, to at least one of the application program 1047. For example, the middleware 1043 can process the one or more task requests according to the priority assigned to the at least one, which makes it possible to perform scheduling or load balancing on the one or more task requests.

The API 1045 can be an interface through which the application program 1047 controls a function provided by the kernel 1041 or the middleware 1043, and can include, for example, at least one interface or function (e.g., an instruction) for a file control, a window control, image processing, a character control, or the like.

The I/O interface 1050 can transmit an instruction or data, input from a user or another external device, to other component(s) of the electronic device 1001. Furthermore, the I/O interface 1050 can output an instruction or data, received from other component(s) of the electronic device 1001, to a user or another external device.

The display 1060 can include, for example, a liquid crystal display (LCD), a light-emitting diode (LED) display, an organic LED (OLED) display, or a microelectromechanical systems (MEMS) display, or an electronic paper display. The display 1060 can display, for example, various contents (e.g., a text, an image, a video, an icon, a symbol, and the like) to a user. The display 1060 can include a touch screen and can receive, for example, a touch, gesture, proximity, or hovering input using an electronic pen or a portion of a user's body.

The communication interface 1070 can establish communication between the electronic device 1001 and an external electronic device (e.g., a first external electronic device 1002, a second external electronic device 1004, or a server 1006). For example, the communication interface 1070 can be connected to a network 1062 through wireless communication or wired communication to communicate with an external device (e.g., a second external electronic device 1004 or a server 1006).

The wireless communication can include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication can include, for example, a local area network 1064. The local area network 1064 can include at least one of, for example, a wireless fidelity (Wi-Fi), a Bluetooth, a near field communication (NFC), a global navigation satellite system (GNSS), or the like. The GNSS can include at least one of a global positioning system (GPS), a global navigation satellite system (Glonass), Beidou Navigation Satellite System (hereinafter referred to as "Beidou"), Galileo (i.e., the European global satellite-based navigation system), or the like according to an available area or a bandwidth, and the like. In this specification, "GPS" and "GNSS" can be interchangeably used. The wired communication can include at least one of, for example, a universal serial bus (USB), a high definition multimedia interface (HDMI), a recommended standard-232 (RS-232), or a plain old telephone service (POTS). The network 1062 can include at least one of telecommunications networks, for example, a computer network (e.g., LAN or WAN), an Internet, or a telephone network.

Each of the first and second external electronic devices 1002 (e.g., the second electronic device 120 of FIG. 1) and 1004 can be a device of which the type is different from or the same as that of the electronic device 1001. According to an embodiment of the present disclosure, the server 1006 can include a group of one or more servers. According to various embodiments, all or a part of operations that the electronic device 1001 will perform can be executed by another or plural electronic devices (e.g., the electronic devices 1002 and 1004 and the server 1006). According to an embodiment, in the case where the electronic device 1001 executes any function or service automatically or in response to a request, the electronic device 1001 may not perform the function or the service internally, but, alternatively additionally, it can request at least a portion of a function associated with the electronic device 1001 at other device (e.g., the electronic devices 1002 and 1004 and the server 1006). The other electronic device (e.g., the electronic device 1002 or 1004 or the server 1006) can execute the requested function or additional function and can transmit the execution result to the electronic device 1001. The electronic device 1001 can provide the requested function or service using the received result or can additionally process the received result to provide the requested function or service. To this end, for example, cloud computing, distributed computing, or client-server computing can be used.

Figure 11:
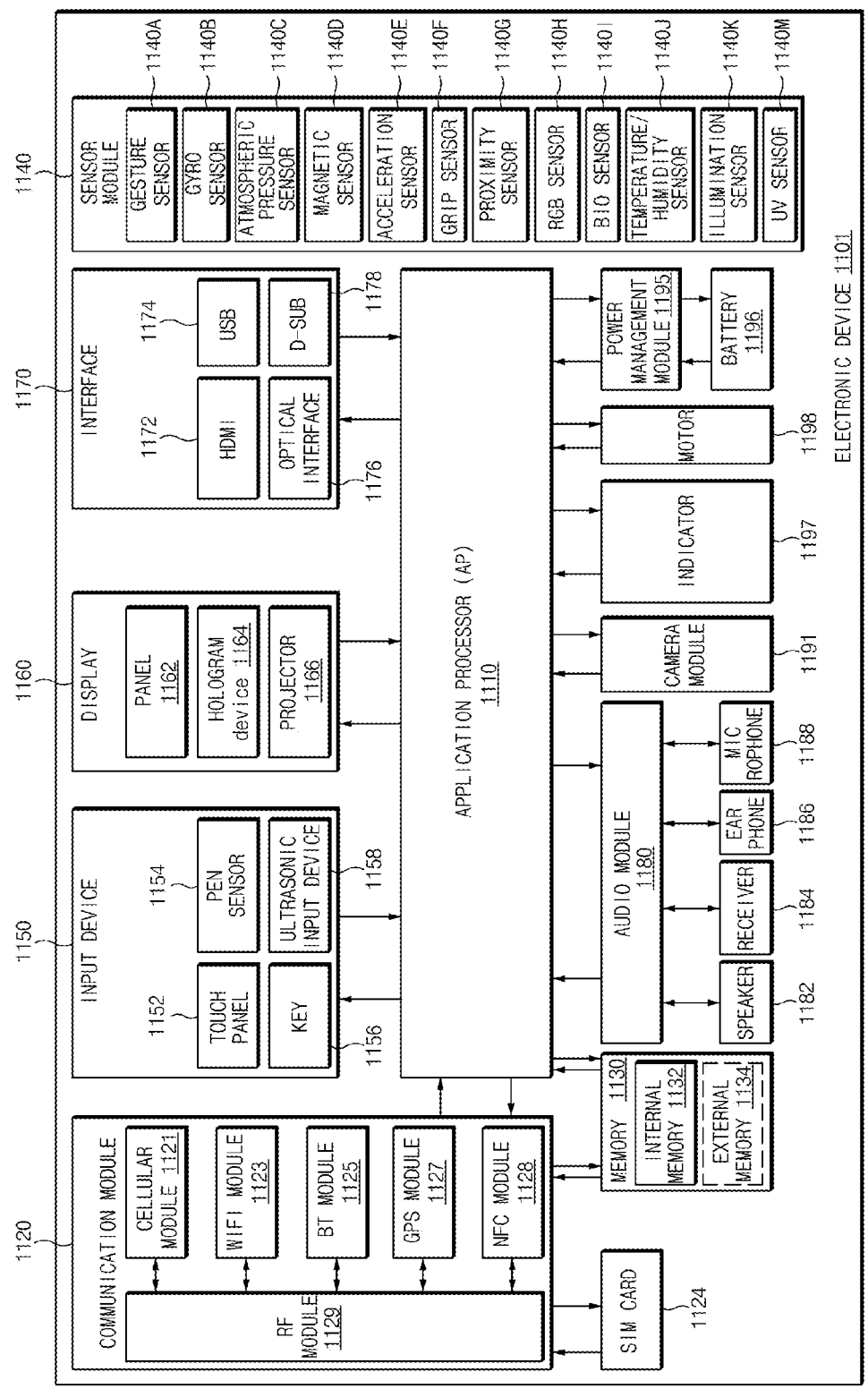
FIG. 11 is a block diagram illustrating an electronic device according to various embodiments of the present disclosure.

FIG. 11 is a block diagram illustrating an electronic device 1101 according to various embodiments of the present disclosure. An electronic device 1101 can include, for example, all or a part of an electronic device 1001 illustrated in FIG. 10. The electronic device 1101 can include one or more processors (e.g., an application processor) 1110, a communication module 1120, a subscriber identification module 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 can drive an operating system (OS) or an application to control a plurality of hardware or software components connected to the processor 1110 and can process and compute a variety of data. The processor 1110 can be implemented with a System on Chip (SoC), for example. According to an embodiment of the present disclosure, the processor 1110 can further include a graphic processing unit (GPU) and/or an image signal processor. The processor 1110 can include at least a part (e.g., a cellular module 1121) of components illustrated in FIG. 11. The processor 1110 can load and process an instruction or data, which is received from at least one of other components (e.g., a nonvolatile memory), and can store a variety of data at a nonvolatile memory.

The communication module 1120 can be configured the same as or similar to a communication interface 1070 of FIG. 10. The communication module 1120 can include a cellular module 1121, a wireless-fidelity (Wi-Fi) module 1123, a Bluetooth (BT) module 1125, a GNSS module (e.g., global positioning system (GPS) module, a Glonass module, Beidou module, or a Galileo module), a near field communication (NFC) module 1128, and a radio frequency (RF) module 1129.

The cellular module 1121 can provide voice communication, video communication, a character service, an Internet service or the like through a communication network. According to an embodiment of the present disclosure, the cellular module 1121 can perform discrimination and authentication of an electronic device 1101 within a communication network using a subscriber identification module 1124 (e.g., a SIM card), for example. According to an embodiment of the present disclosure, the cellular module 1121 can perform at least a portion of functions that the processor 1110 provides. According to an embodiment of the present disclosure, the cellular module 1121 can include a communication processor (CP).

Each of the Wi-Fi module 1123, the BT module 1125, the GNSS module 1127, and the NFC module 1128 can include a processor for processing data exchanged through a corresponding module, for example. According to an embodiment of the present disclosure, at least a portion (e.g., two or more components) of the cellular module 1121, the Wi-Fi module 1123, the BT module 1125, the GNSS module 1127, and the NFC module 1128 can be included within one Integrated Circuit (IC) or an IC package.

The RF module 1129 can transmit and receive a communication signal (e.g., an RF signal). The RF module 1129 can include a transceiver, a power amplifier module (PAM), a frequency filter, a low noise amplifier (LNA), an antenna, or the like. According to various embodiments of the present disclosure, at least one of the cellular module 1121, the Wi-Fi module 1123, the BT module 1125, the GNSS module 1127, or the NFC module 1128 can transmit and receive an RF signal through a separate RF module.

The subscriber identification module 1124 can include, for example, a card and/or embedded SIM which includes a subscriber identification module and can include unique identification information (e.g., integrated circuit card identifier (ICCID)) or subscriber information (e.g., integrated mobile subscriber identity (IMSI)).

The memory 1130 (e.g., the memory 1030 of FIG. 10) can include an internal memory 1132 or an external memory 1134. For example, the internal memory 1132 can include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1134 can include a flash drive, for example, compact flash (CF), secure digital (SD), micro secure digital (Micro-SD), mini secure digital (Mini-SD), extreme digital (xD), multimedia card (MMC), a memory stick, or the like. The external memory 1134 can be functionally and/or physically connected to the electronic device 1101 through various interfaces.

The sensor module 1140 can measure, for example, a physical quantity or can detect an operation state of the electronic device 1101. The sensor module 1140 can convert the measured or detected information to an electric signal. The sensor module 1140 can include at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., red, green, blue (RGB) sensor), a biometric sensor 1140I, a temperature/humidity sensor 1140J, an illuminance sensor 1140K, or an UV sensor 1140M. Even though not illustrated, additionally or alternatively, the sensor module 1140 can further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1140 can further include a control circuit for controlling at least one or more sensors included therein. According to an embodiment of the present disclosure, the electronic device 1101 can further include a processor which is a part of the processor 1110 or independent of the processor 1110 and is configured to control the sensor module 1140. The processor can control the sensor module 1140 while the processor 910 remains in a sleep state.

The input device 1150 can include, for example, a touch panel 1152, a (digital) pen sensor 1154, a key 1156, or an ultrasonic input unit 1158. The touch panel 1152 can use at least one of capacitive, resistive, infrared, or ultrasonic detecting methods. Also, the touch panel 1152 can further include a control circuit. The touch panel 1152 can further include a tactile layer to provide a tactile reaction to a user.

The (digital) pen sensor 1154 can be, for example, a part of a touch panel or can include an additional sheet for recognition. The key 1156 can include, for example, a physical button, an optical key, a keypad, and the like. The ultrasonic input device 1158 can detect (or sense) an ultrasonic signal, which is generated from an input device, through a microphone (e.g., a microphone 1188) and can check data corresponding to the detected ultrasonic signal.

The display 1160 (e.g., the display 1060 of FIG. 10) can include a panel 1162, a hologram device 1164, or a projector 1166. The panel 1162 can be configured the same as or similar to a display 1060 of FIG. 10. The panel 1162 can be implemented to be flexible, transparent or wearable, for example. The panel 1162 and the touch panel 1152 can be integrated into a single module. The hologram device 1164 can display a stereoscopic image in a space using a light interference phenomenon. The projector 1166 can project light onto a screen so as to display an image. The screen can be arranged in the inside or the outside of the electronic device 1101. According to an embodiment of the present disclosure, the display 1160 can further include a control circuit for controlling the panel 1162, the hologram device 1164, or the projector 1166.

The interface 1170 can include, for example, a high-definition multimedia interface (HDMI) 1172, a universal serial bus (USB) 1174, an optical interface 1176, or a D-subminiature (D-sub) 1178. The interface 1170 can be included, for example, in the communication interface 1070 illustrated in FIG. 10. Additionally or alternatively, the interface 1170 can include, for example, a mobile high definition link (MHL) interface, a SD card/multi-media card (MMC) interface, or an infrared data association (IrDA) standard interface.

The audio module 1180 can convert a sound and an electric signal in dual directions. At least a portion of the audio module 1180 can be included, for example, in an input/output interface 1050 illustrated in FIG. 10. The audio module 1180 can process, for example, sound information that is inputted or outputted through a speaker 1182, a receiver 1184, an earphone 1186, or a microphone 1188.

The camera module 1191 for shooting a still image or a video can include, for example, at least one image sensor (e.g., a front sensor or a rear sensor), a lens, an image signal processor (ISP), or a flash (e.g., an LED or a xenon lamp).

The power management module 1195 can manage, for example, power of the electronic device 1101. According to an embodiment of the present disclosure, a power management integrated circuit (PMIC) a charger IC, or a battery or fuel gauge can be included in the power management module 1195. The PMIC can have a wired charging method and/or a wireless charging method. The wireless charging method can include, for example, a magnetic resonance method, a magnetic induction method or an electromagnetic method and can further include an additional circuit, for example, a coil loop, a resonant circuit, or a rectifier, and the like. The battery gauge can measure, for example, a remaining capacity of the battery 1196 and a voltage, current or temperature thereof while the battery is charged. The battery 1196 can include, for example, a rechargeable battery or a solar battery.

The indicator 1197 can display a specific state of the electronic device 1101 or a portion thereof (e.g., a processor 1110), such as a booting state, a message state, a charging state, or the like. The motor 1198 can convert an electrical signal into a mechanical vibration and can generate the following effects: vibration, haptic, and the like. Even though not illustrated, a processing device (e.g., a GPU) for supporting a mobile TV can be included in the electronic device 1101. The processing device for supporting a mobile TV can process media data according to the standards of digital multimedia broadcasting (DMB), digital video broadcasting (DVB), MediaFlo™, or the like.

Each of the above-mentioned elements of the electronic device according to various embodiments of the present disclosure can be configured with one or more components, and the names of the elements can be changed according to the type of the electronic device. The electronic device according to various embodiments of the present disclosure can include at least one of the above-mentioned elements, and some elements can be omitted or other additional elements can be added. Furthermore, some of the elements of the electronic device according to various embodiments of the present disclosure can be combined with each other so as to form one entity, so that the functions of the elements can be performed in the same manner as before the combination.

According to various embodiments of the present disclosure, an electronic device which is connectable to an auxiliary device can include a display, a memory, a communication module configured to perform local communication, and a processor configured to control the display, the memory, or the communication module and the processor can connect with an external electronic device through local communication based on at least one of first identification information received through the auxiliary device or second identification information stored in the memory.

According to various embodiments of the present disclosure, in the case where the first identification information and the second identification information are different from each other, the processor can connect with the external electronic device through the local communication. The processor can transmit a response request signal, which includes the first identification information, to a surrounding device. The processor can search for a surrounding signal which includes the second identification information. The local communication can be a communication by a way of Wi-Fi Direct.

According to various embodiments of the present disclosure, the auxiliary device can include a contact area which is physically connectable with the electronic device and a circuitry configured to store the first identification information through the contact area. The auxiliary device can include at least one of an input pen, a keyboard device, a battery cover, or a decoration device.

Figure 12:
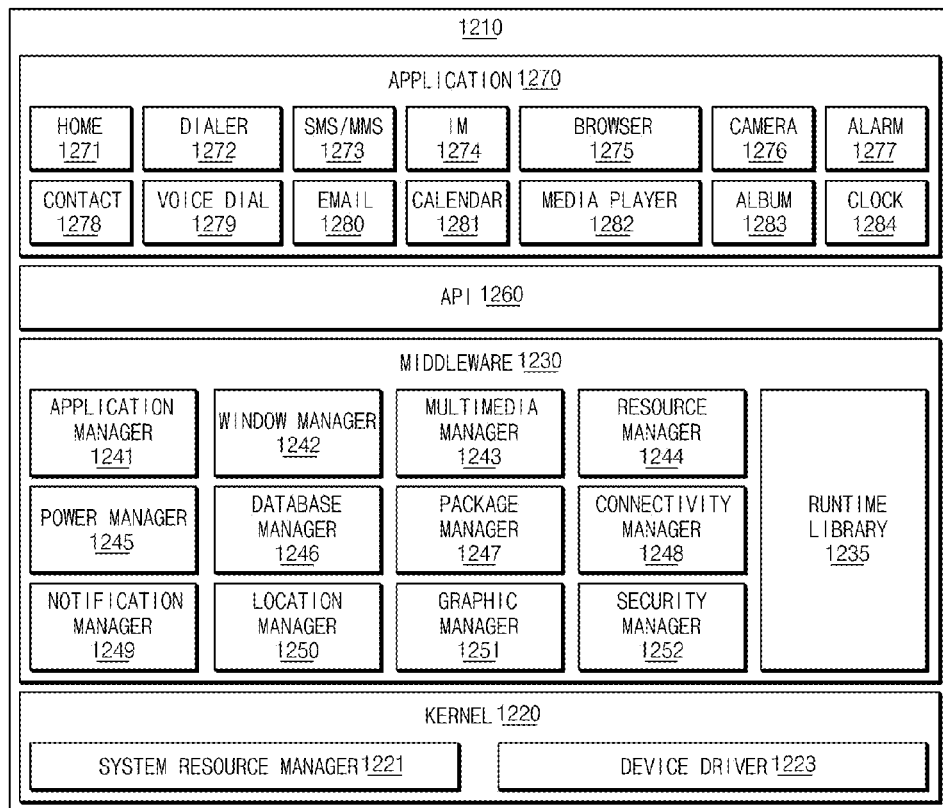
FIG. 12 is a block diagram of a program module according to various embodiments of the present disclosure.

FIG. 12 is a block diagram of a program module according to various embodiments of the present disclosure. According to an embodiment of the present disclosure, a program module 1210 (e.g., the program 1040 of FIG. 10) can include an operating system (OS) to control resources associated with an electronic device (e.g., the electronic device 1001 of FIG. 10), and/or diverse applications (e.g., the application program 1047 of FIG. 10) driven on the OS. The OS can be, for example, Android®, iOS, windows, symbian, tizen, or bada.

The program can include, for example, a kernel 1220, a middleware 1230, an application programming interface (API) 1260, and/or an application 1270. At least a part of the program module 1210 can be preloaded on an electronic device or can be downloadable from an external electronic device (e.g., the electronic devices 1002 and 1004, the server 1006, and the like of FIG. 10).

The kernel 1220 (e.g., the kernel 1041 of FIG. 10) can include, for example, a system resource manager 1221 or a device driver 1223. The system resource manager 1221 can perform control, allocation, or retrieval of system resources. According to an embodiment of the present disclosure, the system resource manager 1221 can include a process managing part, a memory managing part, or a file system managing part. The device driver 1223 can include, for example, a display driver, a camera driver, a Bluetooth driver, a common memory driver, an USB driver, a keypad driver, a Wi-Fi driver, an audio driver, or an inter-process communication (IPC) driver.

The middleware 1230 can provide, for example, a function which the application 1270 needs in common, or can provide diverse functions to the application 1270 through the API 1260 to allow the application 1270 to efficiently use limited system resources of the electronic device. According to an embodiment of the present disclosure, the middleware 1230 (e.g., the middleware 1043 of FIG. 10) can include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, or a security manager 1252.

The runtime library 1235 can include, for example, a library module which is used by a compiler to add a new function through a programming language while the application 1270 is being executed. The runtime library 1235 can perform input/output management, memory management, or capacities about arithmetic functions.

The application manager 1241 can manage, for example, a life cycle of at least one application of the application 1270. The window manager 1242 can manage a GUI resource which is used in a screen. The multimedia manager 1243 can identify a format necessary for playing diverse media files and can perform encoding or decoding of media files by using a codec suitable for the format. The resource manager 1244 can manage resources such as a storage space, memory, or source code of at least one application of the application 1270.

The power manager 1245 can operate, for example, with a basic input/output system (BIOS) to manage a battery or power, and can provide power information for an operation of an electronic device. The database manager 1246 can generate, search for, or modify database which is to be used in at least one application of the application 1270. The package manager 1247 can install or update an application which is distributed in the form of package file.

The connectivity manager 1248 can manage, for example, wireless connection such as Wi-Fi or Bluetooth. The notification manager 1249 can display or notify an event such as arrival message, promise, or proximity notification in a mode that does not disturb a user. The location manager 1250 can manage location information about an electronic device. The graphic manager 1251 can manage a graphic effect that is provided to a user or manage a user interface relevant thereto. The security manager 1252 can provide a general security function necessary for system security or user authentication. According to an embodiment of the present disclosure, in the case where an electronic device (e.g., the electronic device 1001 of FIG. 10) includes a telephony function, the middleware 1230 can further includes a telephony manager for managing a voice or video call function of the electronic device.

The middleware 1230 can include a middleware module that combines diverse functions of the above-described components. The middleware 1230 can provide a module specialized to each OS kind to provide differentiated functions. Additionally, the middleware 1230 can dynamically remove a part of the preexisting components or can add a new component thereto.

The API 1260 (e.g., the API 1045 of FIG. 10) can be, for example, a set of programming functions and can be provided with a configuration which is variable depending on an OS. For example, in the case where an OS is the android or the iOS, it can be permissible to provide one API set per platform. In the case where an OS is the tizen, it can be permissible to provide two or more API sets per platform.

The application 1270 (e.g., the application program 1047 of FIG. 10) can include, for example, one or more applications capable of providing functions for a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, and a timepiece 1284, or for offering health care (e.g., measuring an exercise quantity or blood sugar) or environment information (e.g., atmospheric pressure, humidity, or temperature).

According to an embodiment, the application 1270 can include an application (hereinafter referred to as "information exchanging application" for descriptive convenience) to support information exchange between the electronic device (e.g., the electronic device 1001 of FIG. 10) and an external electronic device (e.g., the electronic device 1002 or 1004 of FIG. 10). The information exchanging application can include, for example, a notification relay application for transmitting specific information to the external electronic device, or a device management application for managing the external electronic device.

For example, the notification relay application can include a function of transmitting notification information, which arise from other applications (e.g., applications for SMS/MMS, e-mail, health care, or environmental information), to an external electronic device (e.g., the electronic device 1002 or 1004 of FIG. 10). Additionally, the notification relay application can receive, for example, notification information from an external electronic device and provide the notification information to a user.

The device management application can manage (e.g., install, delete, or update), for example, at least one function (e.g., turn-on/turn-off of an external electronic device itself (or a part of components) or adjustment of brightness (or resolution) of a display) of the external electronic device (e.g., the electronic device 1002 or 1004 of FIG. 10) which communicates with the electronic device, an application running in the external electronic device, or a service (e.g., a call service, a message service, or the like) provided from the external electronic device.

According to an embodiment of the present disclosure, the application 1270 can include an application (e.g., a health care application of a mobile medical device, and the like) which is assigned in accordance with an attribute of the external electronic device (e.g., the electronic device 1002 or 1004 of FIG. 10). According to an embodiment of the present disclosure, the application 1270 can include an application which is received from an external electronic device (e.g., the server 1006 or the electronic device 1002 or 1004 of FIG. 10). According to an embodiment of the present disclosure, the application 1270 can include a preloaded application or a third party application which is downloadable from a server. The component titles of the program module 1210 according to the embodiment of the present disclosure can be modifiable depending on kinds of OSs.

According to various embodiments of the present disclosure, at least a portion of the program module 1210 can be implemented by software, firmware, hardware, or a combination of two or more thereof. At least a portion of the program module 1210 can be implemented (e.g., executed), for example, by a processor (e.g., the processor 1020 of FIG. 10). At least a portion of the program module 1210 can include, for example, modules, programs, routines, sets of instructions, or processes, or the like for performing one or more functions.

The term "module" used herein can represent, for example, a unit including one or more combinations of hardware, software and firmware. The term "module" can be interchangeably used with the terms "unit", "logic", "logical block", "component" and "circuit". The "module" can be a minimum unit of an integrated component or can be a part thereof. The "module" can be a minimum unit for performing one or more functions or a part thereof. The "module" can be implemented mechanically or electronically. For example, the "module" can include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure can be, for example, implemented by instructions stored in a computer-readable storage media in the form of a program module. The instruction, when executed by a processor (e.g., the processor 1020 of FIG. 10), can cause the one or more processors to perform a function corresponding to the instruction. The computer-readable storage media, for example, can be the memory 1030 of FIG. 10.

A computer-readable recording medium can include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction can include not only a mechanical code such as things generated by a compiler but also a high-level language code executable on a computer using an interpreter. The above hardware unit can be configured to operate via one or more software modules for performing an operation of the present disclosure, and vice versa.

According to various embodiments of the present disclosure, the computer-readable storage media may store program to perform the following: receiving first identification information through an auxiliary device which is connectable to an electronic device, comparing the received first identification information with second identification information stored in the electronic device, and in the case where the first and second identification information are different from each other, connecting with an external device through local communication based on at least one of the first or second identification information in the case where the first and second identification information are different from each other.

The communication method according to various embodiments of the present disclosure may be simply connected to the local wireless communication so as to perform functions, such as data transmission, screen mirroring, and the like, by exchanging auxiliary devices (e.g., touch pens) which is connectable to the electronic device.

The communication method according to various embodiments of the present disclosure may simply end the local wireless communication by releasing the auxiliary device which is connected to the electronic device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method performed at an electronic device, the method comprising;
receiving first identification information through an auxiliary device that is connectable with the electronic device, if the auxiliary device is connected to the electronic device, wherein the auxiliary devices is one of: an input device, a cover, a case, or a decoration device;
comparing the received first identification information to second identification information stored in the electronic device; and
connecting with an external electronic device through local communication based on at least one of the first identification information or the second identification information, if the first identification information and the second identification information are different from each other.

2. The method of claim 1, wherein the connecting through the local communication comprises:
transmitting a response request signal including the first identification information.

3. The method of claim 1, wherein the connecting through the local communication comprises:
searching for a surrounding signal including the second identification information.

4. The method of claim 1, wherein the connecting through the local communication comprises:
connecting through the local communication based on state information about the electronic device.

5. The method of claim 1, wherein the receiving of the first identification information comprises:
connecting physically with the electronic device through a contact area included in the auxiliary device.

6. The method of claim 5, wherein the receiving of the first identification information comprises:
receiving the first identification information through the contact area.

7. The method of claim 1, further comprising:
providing a user interface (UI) for the local communication through a display.

8. The method of claim 1, further comprising:
ending the local communication if a connection between the auxiliary device and the electronic device is released.

9. The method of claim 1, further comprising: ending the local communication if the electronic device and an auxiliary device which is related with the electronic device in advance are connected with each other.

10. A communication method performed between first and second electronic devices, the method comprising:
receiving first identification information from an auxiliary device that is connectable with the first electronic device, at the first electronic device, if the auxiliary device is connected to the first electronic device, wherein the auxiliary devices is one of: an input device, a cover, a case or a decoration device;
comparing the received first identification information to second identification information, which is stored in the first electronic device, at the first electronic device; and
connecting with the second electronic device through local communication based on at least one of the first or second identification information at the first electronic device, if the first and second identification information are different from each other.

11. The method of claim 10, wherein the connecting through the local communication comprises:
transmitting a response request signal including the first identification information, to the second electronic device at the first electronic device.

12. The method of claim 10, wherein the connecting through the local communication comprises:

searching for a response request signal including the second identification information, transmitted from the second electronic device at the first electronic device.

13. An electronic device that is connectable to an auxiliary device, the electronic device comprises:
   a display;
   a memory;
   a communication module configured to perform local communication; and
   a processor configured to:
      control the display, the memory, or the communication module; and
      if the auxiliary device is connected to the electronic device, connect with an external electronic device through local communication based on at least one of first identification information received through the auxiliary device or second identification information stored in the memory, wherein the auxiliary device comprises at least one of an input pen, a keyboard device, a battery cover, or a decoration device.

14. The electronic device of claim 13, wherein if the first identification information and the second identification information are different from each other, the processor is configured to connect with the external electronic device through the local communication.

15. The electronic device of claim 13, wherein the processor is configured to transmit a response request signal, which includes the first identification information, to a surrounding device.

16. The electronic device of claim 13, wherein the processor is configured to search for a surrounding signal which includes the second identification information.

17. The electronic device of claim 13, wherein the auxiliary device comprises:
   a contact area that is physically connectable with the electronic device; and
   a circuitry configured to store the first identification information through the contact area.

18. The electronic device of claim 13, wherein the processor is configured to communicate, via the communication module, with a second electronic device in response to connecting a second auxiliary device to the electronic device and connecting the auxiliary device to the second electronic device.

19. The electronic device of claim 13, wherein the local communication is a communication by way of Wi-Fi Direct.

* * * * *